United States Patent Office 3,239,529
Patented Mar. 8, 1966

3,239,529
RESOLUTION OF WARFARIN AND MARCOUMAR
Seymour Preis, San Diego, Calif., and Bruce David West, Madison, and Karl Paul Link, Middleton, Wis., assignors to Wisconsin Alumini Research Foundation, Madison, Wis., a corporation of Wisconsin
No Drawing. Filed Mar. 1, 1962, Ser. No. 176,768
3 Claims. (Cl. 260—284)

The present invention relates to the resolution of racemic warfarin, i.e. rac-warfarin and related products.

The anticoagulant rac-warfarin [3-α(acetonylbenzyl)-4-hydroxycoumarin] was synthesized by K. P. Link et al. by the Michael condensation of 4-hydroxycoumarin with benzalacetone, J. Am. Chem. Soc., 66, 902 (1944). In 1948, it was proposed for rodent control and rapidly gained worldwide use. In 1952, its water-soluble sodium derivative was introduced for clinical use. It now rivals Dicumarol [3,3' - methylenebis - (4-hydroxycoumarin)] through which oral anticoagulation was made possible. K. P. Link, Circulation, 19, 97 (1959).

Attempts to form covalent diasteroisomers with the resolving agents 1-menthoxyacetyl chloride and 1-methyl-bromo-acetate yielded unsatisfactory products. d-Camphor-10-sulfonyl chloride yielded a crystalline ester which apparently existed as a "diastero compound." The compound 1-menthydrazide, known as the Woodward reagent, J. Am. Chem. Soc., 63, 120 (1941), was also tried but did not yield a resolvable product.

It was known that the acid strength of warfarin (pKa 4.8) permits formation of stable alkaloid salts. However, attempts to form crystalline salts with quinine, strychnine, cinchonine, cinchonidine, brucine and nicotine were unsuccessful. The quinine methohydroxide-warfarin salt was crystalline, but after 17 recrystallizations it was not optically pure. In continued investigations it was then discovered that quinidine in combination with quinine could be used in the resolution of rac-warfarin to yield (S)-warfarin and (R)-warfarin as described in detail below.

EXAMPLE I

Quinidine-(S)-warfarin salt and (S)-warfarin [(—)(S)]: A mixture of 2 l. of chloroform and 3 l. of acetone containing 324 g. (1.0 mole) of quinidine and 308 g. (1.0 mole) of rac-warfarin was warmed to effect solution. A crystalline product separated and the solution was held at −10° overnight. The quinidine-warfarin salt, filtered from the solution (filtrate A), weighed 241 g., $[\alpha]_D^{24}$ +92° (c. 1.8, 95% ethanol). A second crystallization from 3.5 l. of acetone yielded 153 g. of pure quinidine-(S)-warfarin salt $[\alpha]_D^{25}$ +87° (c. 1.7, 95% ethanol). The quinidine-(S)-warfarin salt was soluble in acetone to the extent of 5 mg./ml. at −10° and 16 mg./ml. at 25°. There was no change in rotation upon recrystallization from acetone or tetrahydrofuran.

The salt was decomposed by partition between 1 l. of warmed 80% sodium hydroxide and 0.5 l. of chloroform. The aqueous layer was added to excess hydrochloric acid and 70 g. of (S)-warfarin was collected.

Crystallization at room temperature from 600 ml. of warmed 80% aqueous acetone yielded (S)-warfarin, M.P. 172–173°, $[\alpha]_D^{25}$ −148.0±0.5° (c. 1.2, 0.5 N sodium hydroxide).

(S)-Warfarin Sodium: An excess of (S)-warfarin was stirred with 7 ml. of 0.5 N sodium hydroxide solution. Lyophilization of the filtrate yielded 1.1 g. (S)-warfarin sodium, $[\alpha]_D^{24}$ −95.8±0.5° (c. 3.2, 95% ethanol).

EXAMPLE II (R)-Warfarin [(+)(R)]: The filtrate A from above was concentrated to 1 l. and diluted with 1 l. of acetone. Upon cooling, 96 g. of quinidine-warfarin salt, $$[\alpha]_D^{25} +105°$$

(c. 2.0, 95% ethanol), separated. The filtrate was concentrated in vacuo to a glass. The glass was taken up in 1 l. of chloroform and extracted with 2 l. of 5% sodium hydroxide. Addition of the aqueous layer to excess hydrochloric acid yielded 124 g. (0.405 mole) of partially (ca. 65%) resolved (R)-warfarin, $$[\alpha]_D^{24} +95±2°$$

(c. 1.0, 0.5 N sodium hydroxide). The warfarin was dissolved in a boiling solution of 132.5 g. (0.405 mole) of quinine in 850 ml. of absolute ethanol. The solution was cooled to room temperature and 3350 ml. of dry ether was added. The solution was then held at −10° for 24 hours. Quinine-warfarin salt (201 g.) was collected by filtration in a cold room, $[\alpha]_D^{25}$ −72.0±0.3° (c. 2.5, 95% ethanol). This product was recrystallized twice by dissolving it in 3 ml. per g. of hot absolute ethanol, adding 12 ml. per g. of dry ether and cooling to −10°. A final recrystallization from 2.5 ml. of absolute ethanol per g. of salt (cooling to room temperature) yielded 88 g. of pure quinine-(R)-warfarin salt, $[\alpha]_D^{23}$ −71.0±0.3° (c. 1.7, 95% ethanol). This salt was partitioned between 1 l. of chloroform and 1 l. of 5% sodium hydroxide and the warfarin was precipitated by the addition of the aqueous phase to excess hydrochloric acid. Crystallization from acetone-water yielded (R)-warfarin, M.P. 170–171°, $[\alpha]_D^{25}$ +149.0±0.5° (c. 2, 0.5 N sodium hydroxide).

Large prismatic crystals of the pure enantiomers were obtained by slow crystallization from acetone or acetic acid. The solubilities of the pure enantiomers at 25° were 112 mg./ml. of acetone and 26 mg./ml. of acetic acid. The solubilities of rac-warfarin were 65 mg./ml. of acetone and 20 mg./ml. of acetic acid.

In a similar manner marcoumar, 3-(α-ethylbenzyl)-4-hydroxycoumarin, can be resolved using the quinidine-quinine combination described above. The following example will serve to illustrate the process.

EXAMPLE III (—) Marcoumar: Rac.-marcoumar (89.5 g., 0.320 mole) and 52.0 g. (0.160 mole) of quinidine base were dissolved in a boiling mixture of 250 ml. of chloroform and 500 ml. of acetone. After this solution had stood at 25° for 24 hrs., 51 g. of marcoumar-quinidine salt was collected by filtration. The air-dried product had an indefinite melting point and $[\alpha]_D^{23}$ 82±1° (c. 1, butanone-2). The mother liquor yielded a glassy product after removal of the solvents. This glass was dissolved in 250 ml. of acetone and the solution was kept at −10° for 24 hours. A second crop of salt (22 g., $$[\alpha]_D^{24} +87.5±1°$$

(c. 1, butanone-2) was collected. The first crop was recrystallized once and the second crop twice, after which the two head fractions were combined and recrystallized once more. The solvent in each case was 45 ml. per g. of a 1:4 v.:v. mixture of absolute ethanol-chloroform. The final fraction (42 g.) had $[\alpha]_D^{23}$ +76.0±1° (c. 1, butanone-2). It was dissolved in 200 ml. of 5% aqueous sodium hydroxide and 200 ml. of chloroform, yielding (—)-marcoumar as an aqueous solution of its sodium salt. Addition of excess hydrochloric acid to this solution yielded (—)-marcoumar which after 1 crystallization from ethanol-water weighed 18 g., $$[\alpha]_D^{28} −122.6±0.5°$$

(c. 2, 95% ethanol), M.P. 170–171°.

(+)-Marcoumar: The pooled mother liquors from all of the above crystallizations of the marcoumar-quinidine salt were concentrated under vacuum. The resulting glassy product was dissolved in 1 l. of aqueous 5% sodium hydroxide and 1 l. of chloroform and the marcoumar was precipitated from the aqueous layer with excess hydrochloric acid, yield 57 g., $[\alpha]_D^{25}$ +39±1° (c. 4, 95% ethanol). This product (0.205 mole) was combined with 62.5 g. (0.205 mole) of quinine in 950 ml. of boiling 95% ethanol. Warm water (360 ml.) was added and the solution was kept at −10° for 24 hours. The marcoumar-quinine salt (99 g., $[\alpha]_D^{24}$ −86.2±1°, (c. 1, butanone)) did not have a definite melting point. It was recrystallized four times from 11 ml. per g. of 70% ethanol-water to yield 44 g. of salt, $[\alpha]_D^{24}$ −63.9±1° (c. 1, butanone-2). This product was recrystallized once from butanone-2 and the resulting product (19 g.) was decomposed in the usual way with sodium hydroxide and chloroform to yield 8.5 g. of (+)-marcoumar (crystallized from alcohol-water). This product had $[\alpha]_D^{27}$ +122.8±0.5° (c. 2, 95% ethanol) and M.P. 170–170.5°. The infrared spectra of chloroform solutions of (+)−, (−)− and rac-marcoumar were indistinguishable.

Investigations have shown that the two enantiomers of warfarin have different anticoagulant potency, (S)-warfarin being about 7 times more active than (R)-warfarin. The more active form can be used to advantage where a small amount of a high potency anticoagulant is indicated. Similarly, the less active form can be used where an anticoagulant of a relatively lower potency is indicated.

In the above warfarin process, rac-warfarin made up of (S)-warfarin [(−)(S)] and (R)-warfarin [(+)(R)] is first reacted with quinidine in an inert organic solvent to form the quinidine-warfarin salt. The resulting solution is next cooled to precipitate the less soluble quinidine-(S)-warfarin salt, the quinidine-(R)-warfarin salt remaining in solution. The quinidine-(S)-warfarin salt recovered by filtration is then converted by conventional means to (S)-warfarin, e.g. by partitioning between a water immiscible organic solvent (CHCl$_3$) and aqueous alkali (NaOH, to yield the (S)-warfarin sodium derivative in the aqueous phase) which upon acidification yields the desired (S)-warfarin as a precipitate. The quinidine-(R)-warfarin salt remaining in solution in the filtrate after recovery of the quinidine-(S)-warfarin salt, is converted to crude (R)-warfarin by the conventional means (alkali partition plus acidification) noted above and the resulting crude material is reacted with quinine in an inert organic solvent to form the quinine-(R)-warfarin salt. The resulting solution is then cooled to precipitate the quinine-(R)-warfarin salt which is converted to the desired (R)-warfarin by the conventional means noted above.

The same general quinidine-quinine procedure is employed to resolve marcoumar into (−)-marcoumar and (+)-marcoumar. While various organic solvents can be used, in the above examples, in all cases where acetone is used the acetone should be alcohol-free.

The crystalline (S)-warfarin-isopropyl complex can be prepared as described in the copending application of Schroder and Link, Serial No. 90,645, filed February 21, 1961, now U.S. Patent No. 3,077,481.

We claim:

1. The improved process of resolving racemic warfarin containing (S)(−)-warfarin and (R)(+)-warfarin, which comprises in first recovering the (S)(−)-warfarin as the quinidine salt by reacting the racemic warfarin with quinidine in an inert organic solvent and cooling the resulting solution to crystallize the quinidine-(S)(−)-warfarin, and then recovering the (R)(+)-warfarin as the quinine salt by reacting the (R)(+)-warfarin with quinine in an inert organic solvent and cooling the resulting solution to crystallize the quinine (R)(+)-warfarin, dissolving the quinine-(R)(+)-warfarin in an inert organic solvent, extracting the resulting solution with aqueous sodium hydroxide and acidifying the resulting aqueous layer to precipitate (R)(+)-warfarin.

2. The process of resolving racemic warfarin containing (S)(−)-warfarin and (R)(+)-warfarin, which comprises reacting racemic warfarin with quinidine dissolved in an inert organic solvent, cooling the resulting solution to crystallize the quinidine-(S)(−)-warfarin, separating the crystalline material from the solution containing quinidine-(R)(+)-warfarin, converting the quinidine-(R)(+)-warfarin to (R)(+)-warfarin by extracting the solution of the quinidine-(R)(+)-warfarin with aqueous sodium hydroxide and acidifying the resulting aqueous layer, reacting the resulting crude (R)(+)-warfarin with quinine in an organic solvent, cooling the resulting solution to crystallize quinine-(R)(+)-warfarin, dissolving the quinine-(R)(+)-warfarin in an inert organic solvent, extracting the resulting solution with aqueous sodium hydroxide and acidifying the resulting aqueous layer to precipitate (R)(+)-warfarin.

3. The improved process of resolving racemic marcoumar [3-(α-ethylbenzyl)-4-hydroxycoumarin] containing (−)-marcoumar and (+)-marcoumar, which comprises in first recovering the (−)-marcoumar as the quinidine salt by reacting the racemic marcoumar with quinidine in an inert organic solvent and cooling the resulting solution to crystallize the quinidine-(−)-marcoumar, and then recovering the (+)-marcoumar as the quinine salt by reacting the (+)-marcoumar with quinine in an inert organic solvent and cooling the resulting solution to crystallize the quinine-(+)-marcoumar, dissolving the quinine-(R)(+)-warfarin in an inert organic solvent, extracting the resulting solution with aqueous sodium hydroxide and acidifying the resulting aqueous layer to precipitate (R)(+)-warfarin.

References Cited by the Examiner

Chmielewska et al.: Chemical Abstracts, vol. 54 (1960), page 16450.

Karrer: Organic Chemistry, Elsevier, New York (1938), pages 87–96.

Preis: Resolution of Warfarin (Thesis), Univ. of Wisconsin, approved Nov. 4, 1957, pages 21–38, 59–67, 72 and 73. (Doctoral Dissertation Series No. 58–822, Reel O-306.)

Preis: Dissertation Abstracts, vol. 18 (1958), pages 793–794.

West et al.: Jour. Amer. Chem. Soc., vol. 83 (June 20, 1961), pages 2676–2679.

WALTER A. MODANCE, *Primary Examiner.*

IRVING MARCUS, *Examiner.*